United States Patent [19]

Saito

[11] 4,252,301
[45] Feb. 24, 1981

[54] STOPPER STRUCTURE OF ENGINE MOUNT

[75] Inventor: Taiji Saito, Okazaki, Japan

[73] Assignee: Toyota Jidosha Kogyo Kabushiki Kaisha, Aichi, Japan

[21] Appl. No.: 7,774

[22] Filed: Jan. 30, 1979

[30] Foreign Application Priority Data

Aug. 2, 1978 [JP] Japan .................................. 53/94792

[51] Int. Cl.³ .............................................. F16F 15/08
[52] U.S. Cl. .................................................. 267/141.5
[58] Field of Search ............... 188/1 B; 248/562, 568, 248/603; 267/140.4, 141.3, 141.4, 141.5, 141.7

[56] References Cited

U.S. PATENT DOCUMENTS 2,621,876  12/1952  Else .................................. 267/141.4

Primary Examiner—Duane A. Reger
Attorney, Agent, or Firm—Oblon, Fisher, Spivak, McClelland & Maier

[57] ABSTRACT

An engine mount comprising an engine mounting insulator including an upper insulating plate, a lower insulating plate and an insulator rubber attached to and between the upper and lower insulating plate and an engine mounting stabilizer attached to the engine side of a vehicle together with the upper insulating plate. The lower metallic insulator has rolling stoppers and stopper rubbers are attached to either the rolling stoppers or the engine mounting stabilizer or both, which stopper rubbers control an excessive movement of the engine.

3 Claims, 4 Drawing Figures

STOPPER STRUCTURE OF ENGINE MOUNT

This invention relates to improvements in the stopper structure of an engine mount used for the mount of an engine on a vehicle.

In many cases, an engine is mounted on a vehicle by attaching a crankcase to a side member or cross members of the vehicle. In such case, engine mounts using shock absorbing rubber are generally employed for the prevention of the direct transmission of vibrations of the engine to the vehicle, otherwise an uncomfortable car would be produced.

The use of such engine mounts not only makes possible the prevention of the direct transmission of engine vibrations to a vehicle, but also they function to control a movement of the engine with front and rear stoppers and rolling stoppers when the engine has moved in a direction different from the moving direction of the vehicle.

In the conventional engine mounts, however, front and rear stoppers are portions of an insulator rubber and they are not effective stoppers because of the elasticity of the insulator rubber. In the prior art where such conventional engine mounts are used, therefore, interference has occurred between, e.g., an oil pan and suspension member, fan and radiator, pipes and body, or the like when the engine has moved due to sudden movement or stop of the vehicle.

An object of this invention is to provide engine mounts capable of controlling a movement of an engine in the longitudinal direction of a vehicle in a limited range even when the engine has moved due to severe driving situations such as sudden movement or stop of the vehicle and preventing any interference between parts of the vehicle.

Another object of this invention is to provide engine mounts which can protect the parts of a vehicle from damage and reduce the maintenance cost of the engine as above mentioned.

Further objects of this invention will become apparent upon a reading of the following detailed description of the invention and annexed drawings in which.

Figure 1:
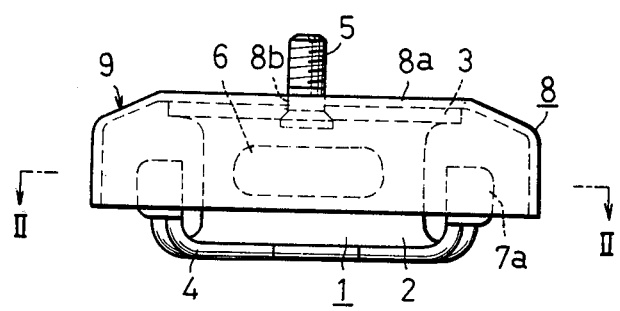
FIG. 1 is an elevational view of an engine mount according to the invention.
Figure 2:
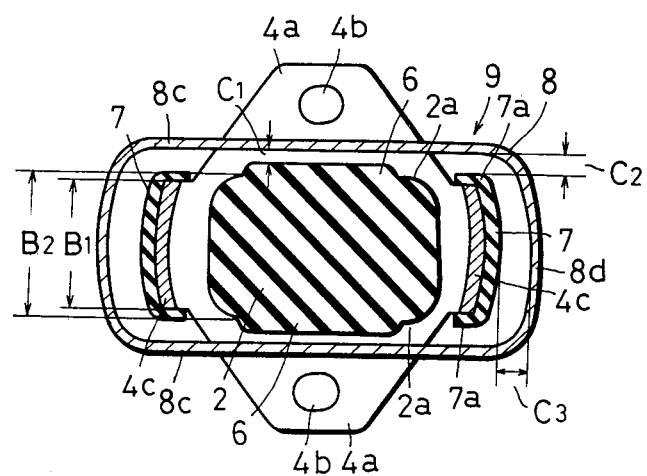
FIG. 2 is a cross sectional view of the engine mount of FIG. 1, taken along line II—II.

Referring to the drawings, FIGS. 1 and 2 disclose an engine mount 9 according to the invention. The engine mount 9 comprises an engine mounting insulator 1 and an engine mounting stabilizer 8. The engine mounting insulator 1 comprises an insulator rubber 2 substantially rectangularly shaped in its horizontal cross section and having parallel top and bottom surfaces, an upper insulating plate 3 attached to the top of the insulator rubber 2 and a lower insulating plate 4 attached to the bottom of the insulator rubber 2 in parallel with the upper insulating plate 3. A stud bolt 5 is planted in the upper central portion of the insulator rubber 2 and projects upwardly from the upper insulating plate 3. The insulator rubber 2 has two stoppers (front and back stoppers) 6,6 projecting from two opposed sides 2a,2a of the rubber 2. The lower insulating plate 4 has two installing portions 4a,4a which project outwardly therefrom in the direction perpendicular to the two opposed sides 2a,2a of the insulator rubber 2. The installing portions 4a,4a each have a hole 4b. The right and left portions (in FIGS. 1 and 2) of the lower insulating plate 4 are upwardly bent at substantially right angles to provide two rolling stoppers 4c,4c. Each of the rolling stoppers 4c,4c is slightly curved outwardly as shown in FIG. 2. The straight width B1 of each rolling stopper 4c is slightly smaller than the length B2 between the two sides 2a,2a of the insulator rubber 2.

A U-shaped rolling stopper rubber 7 is attached to the outside and lateral ends of each rolling stopper 4c. Inwardly bent portions 7a,7a of each rolling stopper 7 are stoppers 7a,7a similar to the front and rear stoppers 6,6 of the insulator rubber 2.

The engine mounting stabilizer 8 is rectangularly shaped as shown in FIG. 2 and has a top 8a provided with a hole 8b. The engine mount 9 can be assembled by passing the stud bolt 5 of the engine mounting insulator 1 through the hole 8b of the stabilizer 8 and covering the insulator 1 with the stabilizer 8. As shown in FIG. 2, the stabilizer 8 surrounds the mounting insulator 1 with two opposed straight walls (front and rear walls) 8c,8c and two opposed curved walls 8d,8d. The straight walls 8c,8c are longer than the curved walls 8d,8d.

When the engine mount 9 is correctly assembled, that is, so that the stabilizer 8 is positioned in parallel with the insulator rubber 2, a space C1 exists between the stoppers 6,6 of the rubber 2 and the straight walls (front and rear walls) 8c,8c of the stabilizer 8 and a space C2 exists between the stoppers 7a,7a of the stopper rubbers 7,7 and the straight walls 8c,8c of the stabilizer 8 as shown in FIG. 2. The space C2 is larger than the space C1 by around 5 mm. to 15 mm. As in the conventional art, a space C3 also exists between the curved walls 8d,8d of the stabilizer 8 and the stopper rubbers 7,7.

Figure 3:
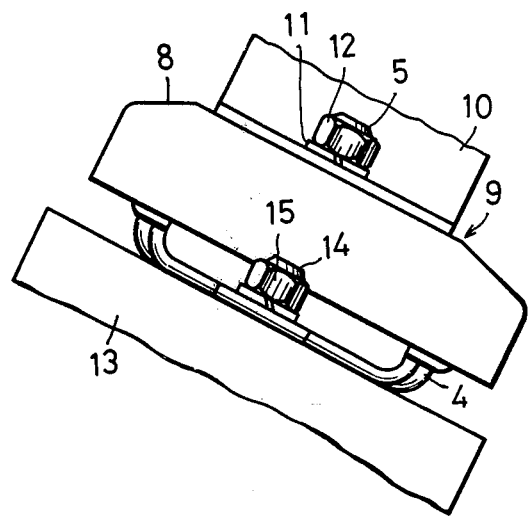
FIG. 3 shows the engine mount of FIG. 1 attached to an engine mounting bracket and a support member bracket.

The engine mount 9 is attached to an engine mounting bracket 10 fixed to the lower portion of an engine (not shown), by means of the stud bolt 5, washer 11 and nut 12. The engine mount 9 thus attached to the engine is then installed, in an inclined manner, to a side member (not shown) or the like of the vehicle, by means such as a bolt 14 and nut 15 (FIG. 3).

Attention is next directed to the function of the engine mount 9. If the engine moves in the longitudinal direction of the vehicle during the normal running of the vehicle, the stabilizer 8 also moves with the front or rear wall 8c thereof colliding with the adjacent stopper 6 of the insulator rubber 2, that is, one of walls 8c,8c moving by the space C1, but the collision stops further movement of the stabilizer 8, and therefore that of the engine.

When the vehicle starts, moves backward or stops suddenly, the engine moves causing the stabilizer 8 to move and collide with the insulator rubber 2 with a greater force than in the case of the normal running of the vehicle. The collision of the stabilizer 8 with the rubber 2 inclines the rubber 2 towards the front or back wall 8c of the stabilizer 8 and the stabilizer 8 further collides with the stoppers 7a,7a, i.e., inwardly bent portions of the stopper rubbers 7,7 attached to the rolling stoppers 4c,4c. That is, in this case, the stabilizer 8 moves by the space C2.

The rolling stoppers 4c,4c are portions of the lower metallic insulator 4 secured to the body of the vehicle by the support member bracket 13. Therefore, the rolling stoppers 4c,4c are not moved by the stabilizer 8 colliding with the stoppers 7a,7a, but the stoppers 7a,7a stop the movement of the stabilizer 8 and therefore, that of the engine. That is, when the vehicle has moved or stopped suddenly, the engine mount 9 functions to stop a movement of the engine in the longitudinal direction of the vehicle.

When the engine moves in the lateral direction of the vehicle, the stabilizer 8 also moves with one of the curved walls 8d,8d thereof colliding with the adjacent stopper rubber 7. Attached to the rolling stopper 4c, the stopper rubber 7 can stop a further movement of the stabilizer 8 and therefore, that of the engine.

Figure 4:
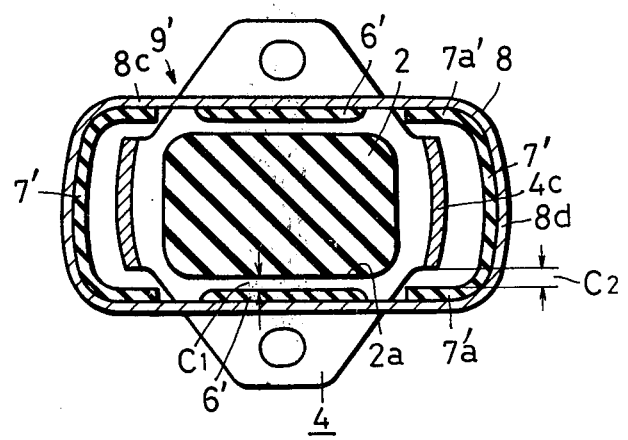
FIG. 4 is a cross sectional view similar to FIG. 1 and shows another engine mount according to the invention.

FIG. 4 shows another embodiment of the invention. In this embodiment, the same parts as in the first embodiment are given the same numerals. An engine mount 9' has two opposed stopper rubbers 6', 6' at the inner surfaces of two opposed straight walls 8c,8c of a stabilizer 8. Two U-shaped stopper rubbers 7',7' are also attached to the inner surface of the stabilizer 8 in an oppositely directed manner. Inwardly directed portions of each stopper rubber 7' are stoppers 7'a,7'a. As in the first embodiment, a space C1 exists between the stopper rubbers 6',6' and an insulator rubber 2. A space C2 is also present between the lateral ends of each rolling stopper 4c and stoppers 7'a,7'a.

If an engine (not shown) moves longitudinally of a vehicle during the normal running of the vehicle, the stabilizer 8 also moves with one of the stopper rubbers 6',6' colliding with the insulator rubber 2, but this collision stops a further movement of the stabilizer 8 and therefore, that of the engine.

When the vehicle moves or stops suddenly, the engine moves causing the stabilizer 8 to move with one of the stopper rubbers 6',6' and stoppers 7'a,7'a colliding with the insulator rubber 2 and rolling stoppers 4c,4c, respectively. The collisions stop a further movement of the stabilizer 8 and that of the engine.

When the engine moves in the lateral direction of the vehicle, the stabilizer 8 also moves with one of the stopper rubbers 7',7' colliding with the adjacent rolling stopper 4c. The rolling stopper can stop the movement of the stabilizer 8 and that of the engine.

What we claim is:

1. A stopper structure in an engine mount for a motor vehicle, comprising:

an engine mounting insulator including a block-like insulator of rubber substantially of a rectangular configuration in its horizontal cross section, having parallel front and rear surfaces and parallel side surfaces, an upper insulating plate attached onto the rubber and a lower insulating plate attached to the bottom of the rubber and having a pair of plate-like rolling stoppers substantially parallel to and spaced from the side surfaces of the rubber outwardly thereof, the lower insulating plate being attached to the body of the vehicle;

an engine mounting stabilizer substantially of a rectangular configuration in its horizontal cross section, having parallel front and rear walls and a pair of side walls perpendicular thereto and covering the insulator, the stabilizer being attached to the engine of the vehicle together with the upper insulating plate;

separate resilient means between the stoppers and stabilizer to cushion impact between the stoppers and stabilizer upon sudden starting or stopping of the vehicle;

the engine mount having spaces between the front rubber surface and front inner stabilizer surface, the rear rubber surface and rear inner stabilizer surface and the stopper side surfaces and side inner stabilizer surfaces in order to restrict the longitudinal movement of the engine relative to the body of the vehicle by means of the stabilizer and rubber and the lateral movement of the engine relative to the body of the vehicle by means of the stabilizer and stoppers, the spaces between the front stopper surfaces and front inner stabilizer surface and the rear stopper surfaces and rear inner stabilizer surface being such that the stabilizer is brought into contact with the stoppers only when the vehicle has started or stopped suddenly, and during normal operation the front and rear rubber surfaces and the stopper surfaces remaining spaced from the stabilizer.

2. A stopper structure in an engine mounted for a motor vehicle as defined in claim 1, wherein: the resilient means comprise a resilient member attached to the front and rear surfaces of each rolling stopper.

3. A stopper structure in an engine mount for a motor vehicle as defined in claim 1, wherein: the resilient means comprise resilient members atached to the engine mounting stabilizer and opposite to the front and rear surfaces of each rolling stopper.

* * * * *